Jan. 23, 1962 F. J. FUCHS, JR 3,017,914
APPARATUS FOR MAKING ZERO RADIUS BENDS IN RECTANGULAR TUBING
Filed Nov. 12, 1957 7 Sheets-Sheet 1

INVENTOR.
F. J. FUCHS, JR.
BY
ATTORNEY

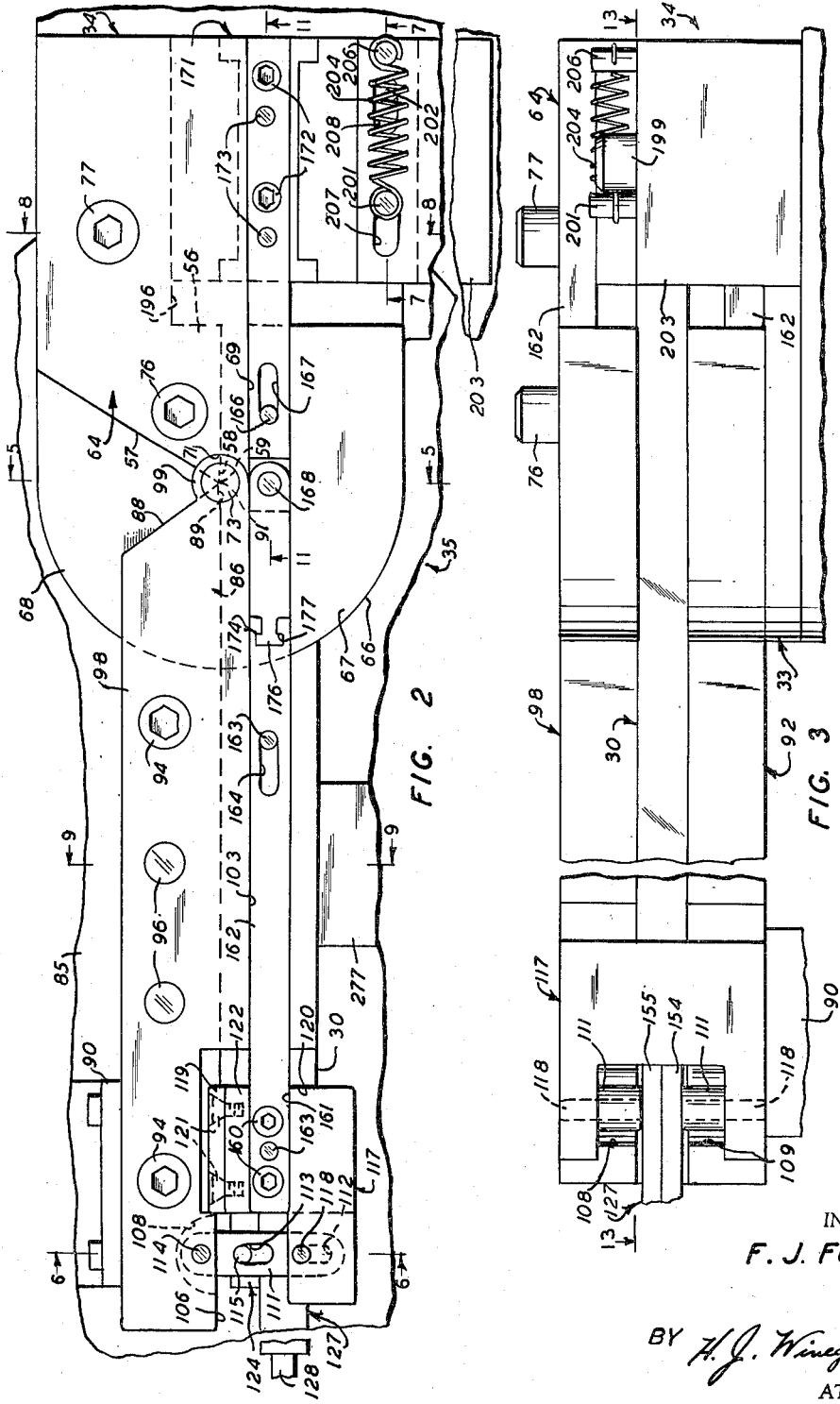

Jan. 23, 1962 F. J. FUCHS, JR 3,017,914
APPARATUS FOR MAKING ZERO RADIUS BENDS IN RECTANGULAR TUBING
Filed Nov. 12, 1957 7 Sheets-Sheet 3

INVENTOR
F. J. FUCHS, JR.

BY *H. J. Winegar*
ATTORNEY

Jan. 23, 1962 F. J. FUCHS, JR 3,017,914
APPARATUS FOR MAKING ZERO RADIUS BENDS IN RECTANGULAR TUBING
Filed Nov. 12, 1957 7 Sheets-Sheet 4
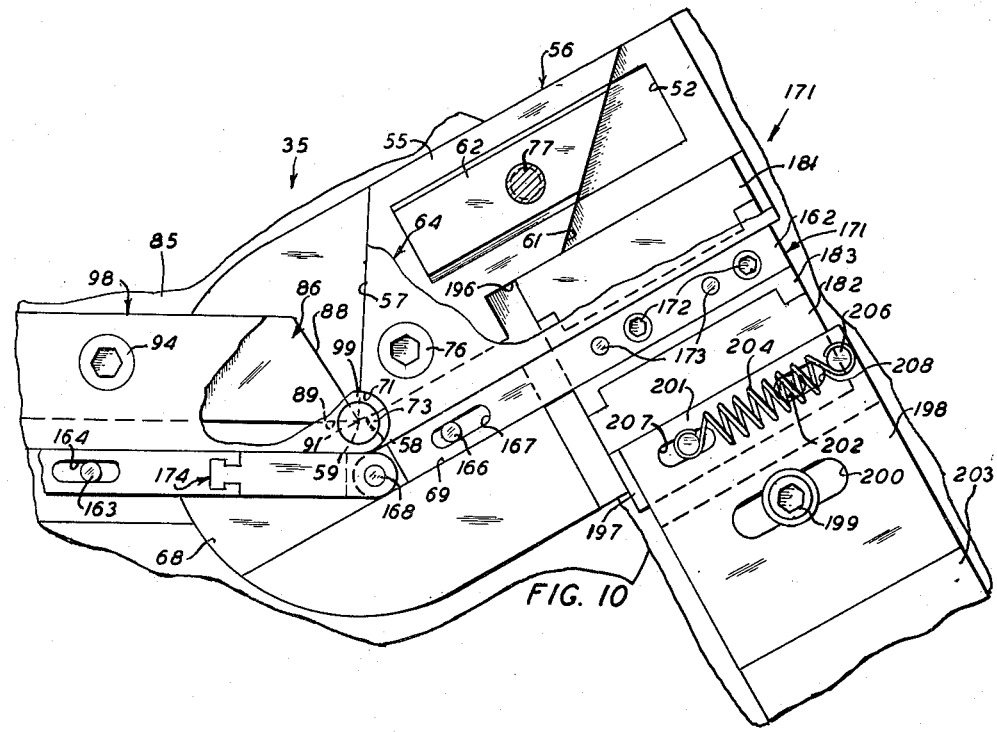
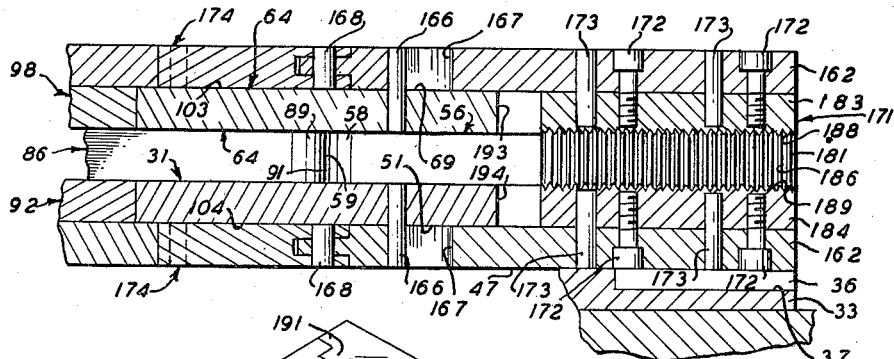
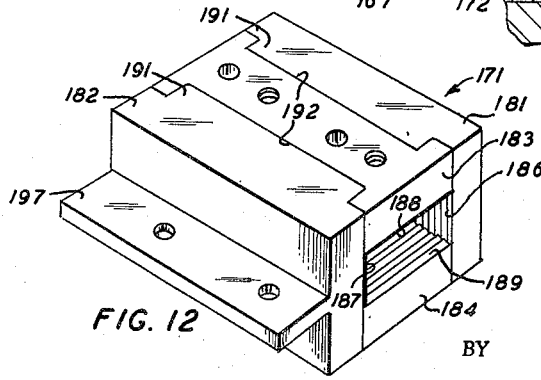
INVENTOR
F. J. FUCHS, JR
BY
ATTORNEY Jan. 23, 1962   F. J. FUCHS, JR   3,017,914
APPARATUS FOR MAKING ZERO RADIUS BENDS IN RECTANGULAR TUBING
Filed Nov. 12, 1957   7 Sheets-Sheet 5
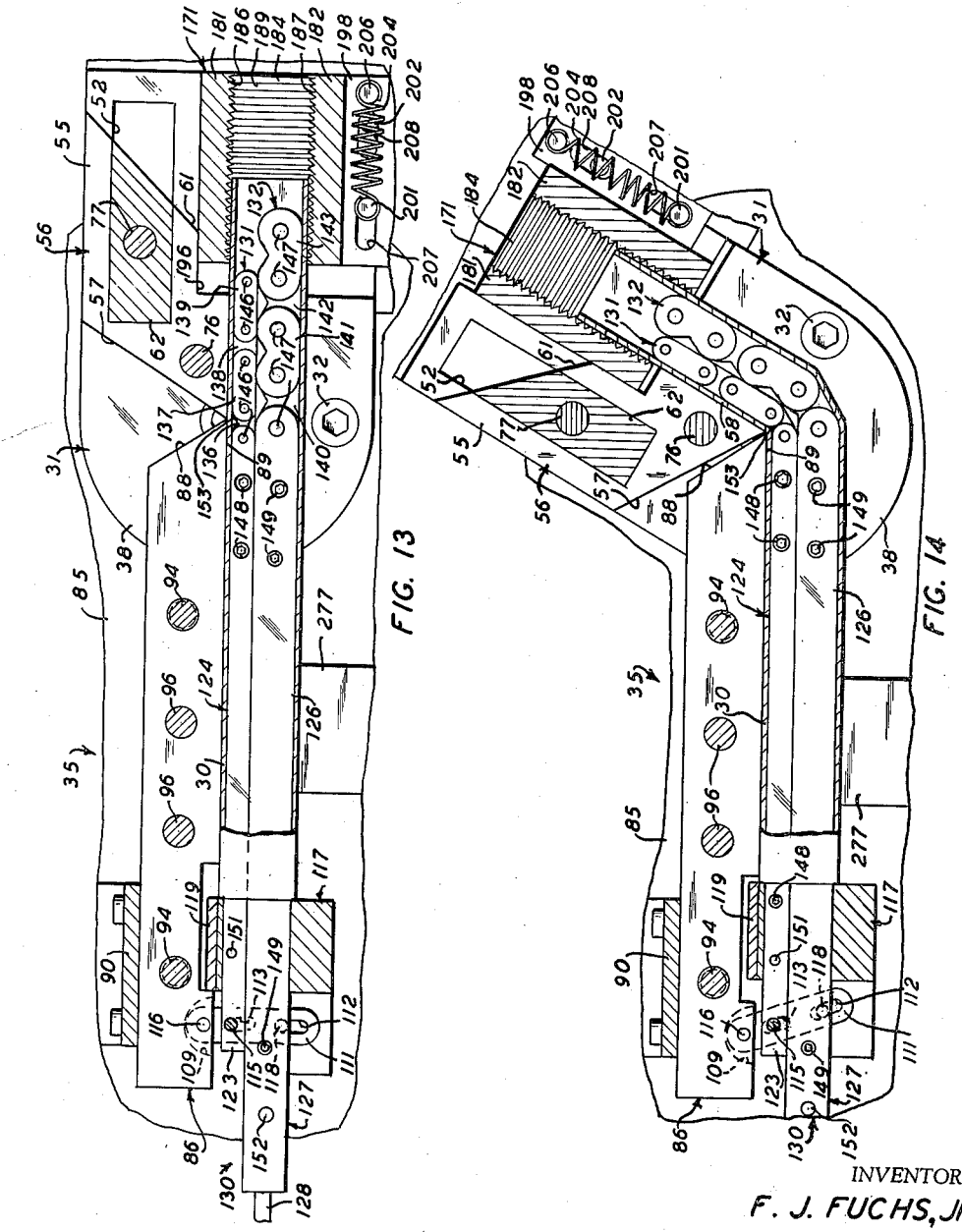
INVENTOR
F. J. FUCHS, JR.
BY H. J. Winegar
ATTORNEY

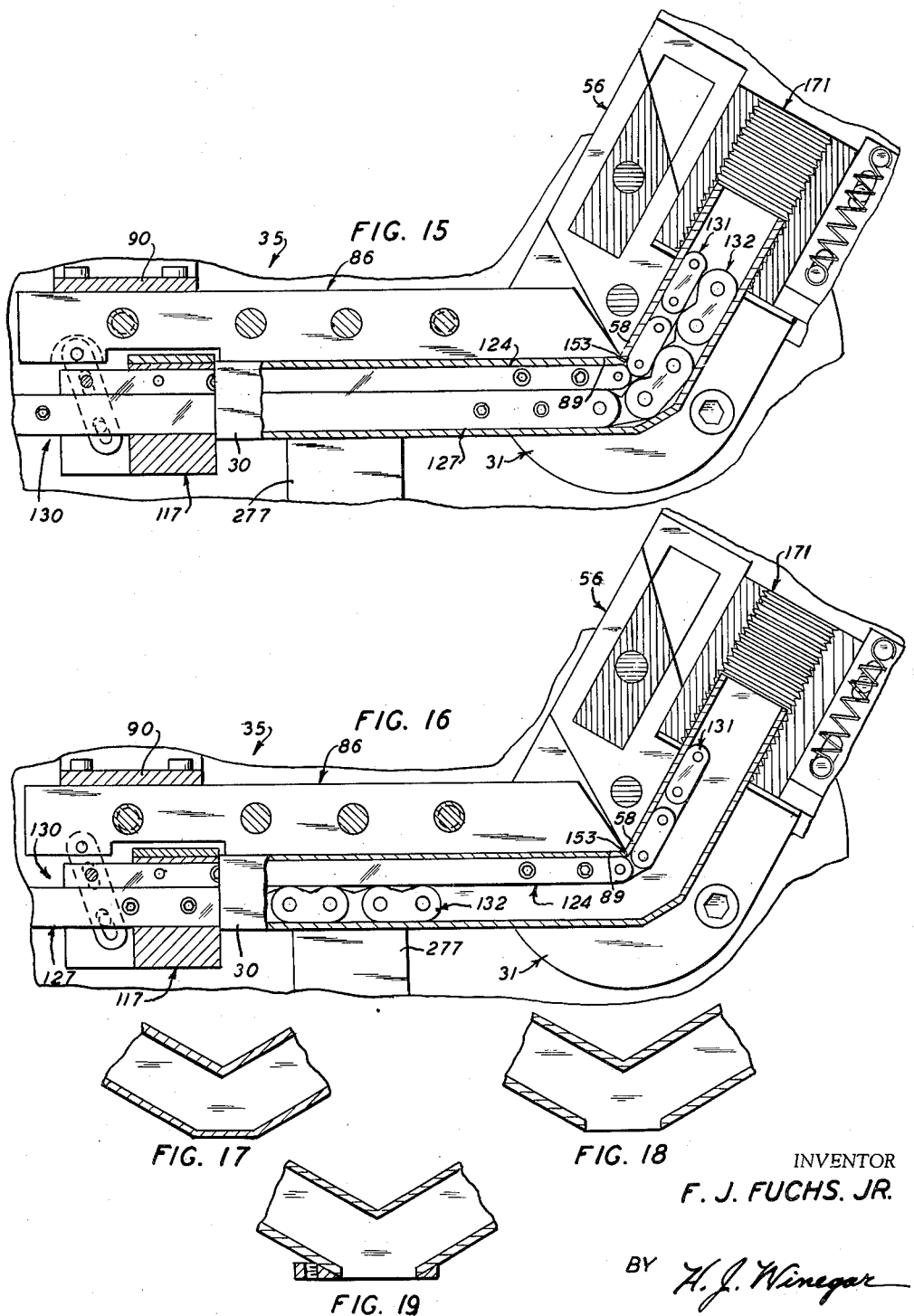

Jan. 23, 1962  F. J. FUCHS, JR  3,017,914
APPARATUS FOR MAKING ZERO RADIUS BENDS IN RECTANGULAR TUBING
Filed Nov. 12, 1957  7 Sheets-Sheet 7
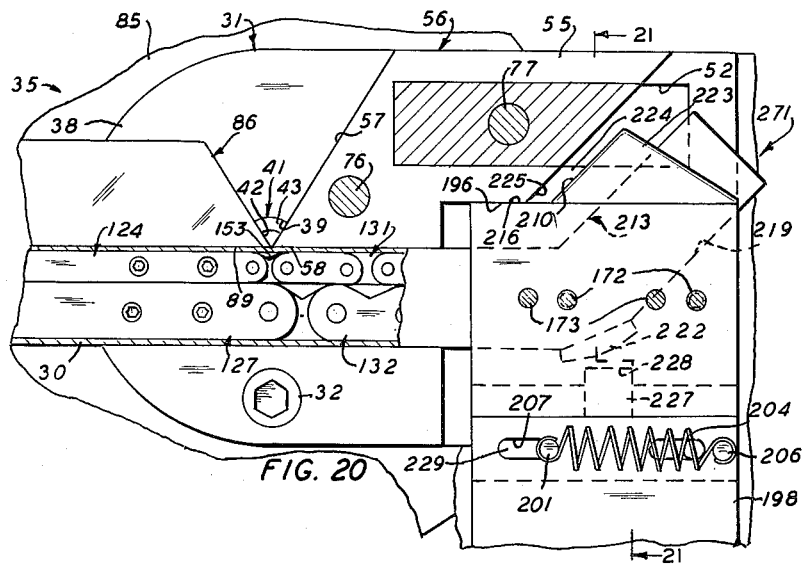
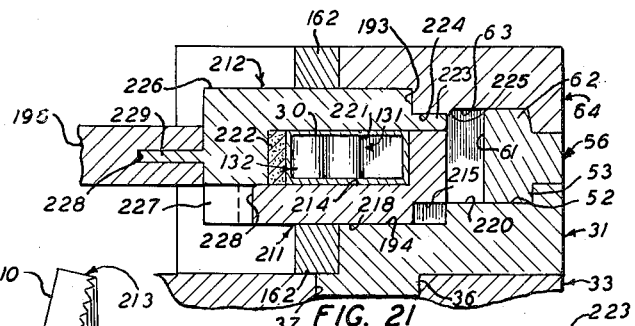
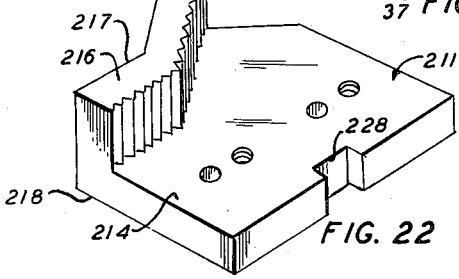
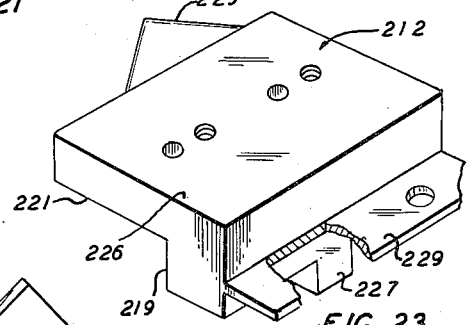
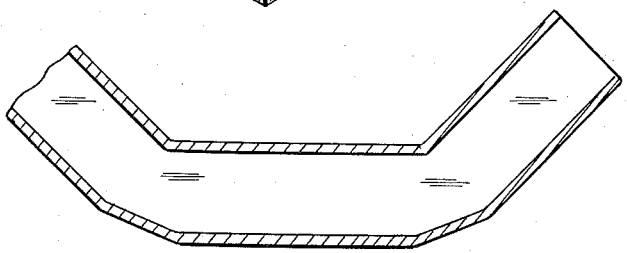
INVENTOR
F. J. FUCHS, JR.
BY H. J. Winegar
ATTORNEY

United States Patent Office 3,017,914
Patented Jan. 23, 1962

3,017,914
APPARATUS FOR MAKING ZERO RADIUS BENDS IN RECTANGULAR TUBING
Francis J. Fuchs, Jr., Winston-Salem, N.C., assignor to Western Electric Company, Incorporated, New York, N.Y., a corporation of New York
Filed Nov. 12, 1957, Ser. No. 695,774
9 Claims. (Cl. 153—20)

This invention relates to apparatus for bending hollow tubular material and more particularly, although not exclusively, to a tube bending apparatus for imparting one or more angular or zero radius H bends in a section of a rectangular wave guide tubing which may be utilized for imparting a directional change in the wave guide tubing with an included angle of 120°.

In bending hollow bodies or tubes, large tensile and compressive stresses are developed within the walls of the tube which may cause buckling or collapsing at the section of bend. This is particularly true in draw bending where the tube is drawn over a mandrel between a pressure die and a wiping die and about a revolving forming die where high pressures are exerted externally against the tubing.

In a draw bending process for bending rectangular tubing, the wall nearest the axis of bend is subjected to compressional forces which tend to increase the wall thickness and the opposing wall furthest from the axis of bend is subjected to tensional forces which tend to stretch and reduce the wall thickness, whereas the walls perpendicular to the axis of bend are subjected to both compressional and tensional forces which tend to change the thickness of these walls depending on which side of a neutral axis any particular portion of the wall in question lies.

In order to overcome buckling and other difficulties and to accurately maintain the internal dimensions of the tube, the walls thereof must be supported from the inside by an appropriate mandrel and supported from the outside of the tube by properly contoured means to allow for the cold flow of the material of the tube in accordance with the teaching of my copending application, Serial Number 412,730, filed February 26, 1954, now Patent Number 2,873,786.

Further, the end of the supporting mandrel must be flexible and be extracted readily after the bending operation is completed. The supporting mandrel should have a smooth, hard continuous surface so that it will keep the internal walls of the tube, being bent, smooth and prevent buckling or wrinkling thereof.

It has been known in the past that wave guides may be provided with gradual changes in direction, of any desired angle, without causing appreciable loss in the efficiency of transmissions when the wave guides are used for conveying high frequency electrical energy in the communications industry, provided the interior dimensions of the tubing be maintained substantially constant.

It is therefore an object of the present invention to provide apparatus for forming accurately angular or zero radius bends in rectangular tubing while maintaining the internal cross sectional dimension of the tubing substantially uniform.

It is a further object of the present invention to provide apparatus for forming 60° Y bends in sections of rectangular wave guide tubing which is adapted to transmit electromagnetic energy from one portion of the guide to another portion of the guide around a 120° angle while maintaining the original electromagnetic field pattern, by keeping the internal walls smooth and by maintaining uniform internal, cross sectional dimensions therein.

Certain features of the invention include supporting one side of the tubing in the region to be bent, supporting the interior of the tubing to prevent inward collapse thereof during the bending operation, restraining a portion of the tubing extending to one side of the portion to be bent against lateral movement, applying a bending force to a portion of the tubing extending to the opposing side of the region to be bent and simultaneously moving the opposing, extending portions of the tubing toward each other and toward the region to be bent along the longitudinal axis of the tube, whereby drag of the interior support with respect to the tubing and pulling strain of the clamping means with respect to the tubing is alleviated.

Apparatus illustrating certain features of the invention may include, a base, a forming die pivotably mounted on the base with a wiper die secured to the base and having one extremity thereof adjacent to one extremity of the forming die, means for securing a portion of a tube to be bent adjacent to the wiper die, means for supporting the interior of the tube during the bending operation, means for pivoting the forming die, tube clamping means secured to the base pivotably with the forming die and slidably with respect thereto along the longitudinal axis of the tube, booster means positioned adjacent to the portion of the tube in contact with the wiper die, and means for connecting operatively the booster means to the clamping means for urging the clamping means and the booster means toward each other along the longitudinal axis of the tube during the bending operation.

Other objects and features of the invention will be more readily understood from the following detailed description when read in conjunction with the accompanying drawings, in which:

FIG. 2 is a fragmental, top plan view of the bending apparatus shown in FIG. 1;

FIG. 3 is a side elevation view of the apparatus shown in FIG. 2;

FIG. 10 is a fragmental, top plan view of the apparatus of FIG. 2 in a partially operated position;

FIG. 11 is a fragmental, sectional view taken along line 11—11 of FIG. 2 without the wave guide tubing and mandrel in place;

FIG. 12 is a perspective view of one embodiment of the clamping dies of the apparatus shown in FIG. 2;

FIG. 13 is a reduced, horizontal section taken along line 13—13 of FIG. 3 with the segmental mandrels shown in place in a rectangular wave guide tube;

FIG. 14 is a reduced, sectional view similar to that of FIG. 13 with the apparatus in its completely operated position;

FIG. 15 is a horizontal, sectional view of the apparatus similar to FIG. 14 but with the removable portion of the segmental mandrel shown in a position wherein it is started to be removed from a section of wave guide therein;

FIG. 16 is a horizontal sectional view of the apparatus similar to that of FIG. 14 with the removable portion of the segmental mandrel partially removed from the section of wave guide therein;

FIG. 17 is a fragmental section of a section of wave guide bent by the apparatus shown in FIG. 2;

FIG. 18 is a fragmental, sectional view of a section of wave guide shown in FIG. 17 with a section thereof removed;

FIG. 19 is a fragmental, sectional view of the section of wave guide shown in FIG. 18 with a flange secured in place thereon;

FIG. 20 is a fragmental, horizontal, sectional view of the apparatus of FIG. 2 with an alternate embodiment of the clamping members with a previously bent section of wave guide in place;

FIG. 21 is a sectional view of the apparatus taken along line 21—21 of FIG. 20;

FIG. 22 and FIG. 23 are the two cooperating elements of the clamping member of the apparatus shown in FIG. 20, and FIG. 24 is a fragmental, cross sectional view of a section of wave guide formed by the combined bending operations of the apparatus shown in FIGS. 2 and 20.

Figure 1:
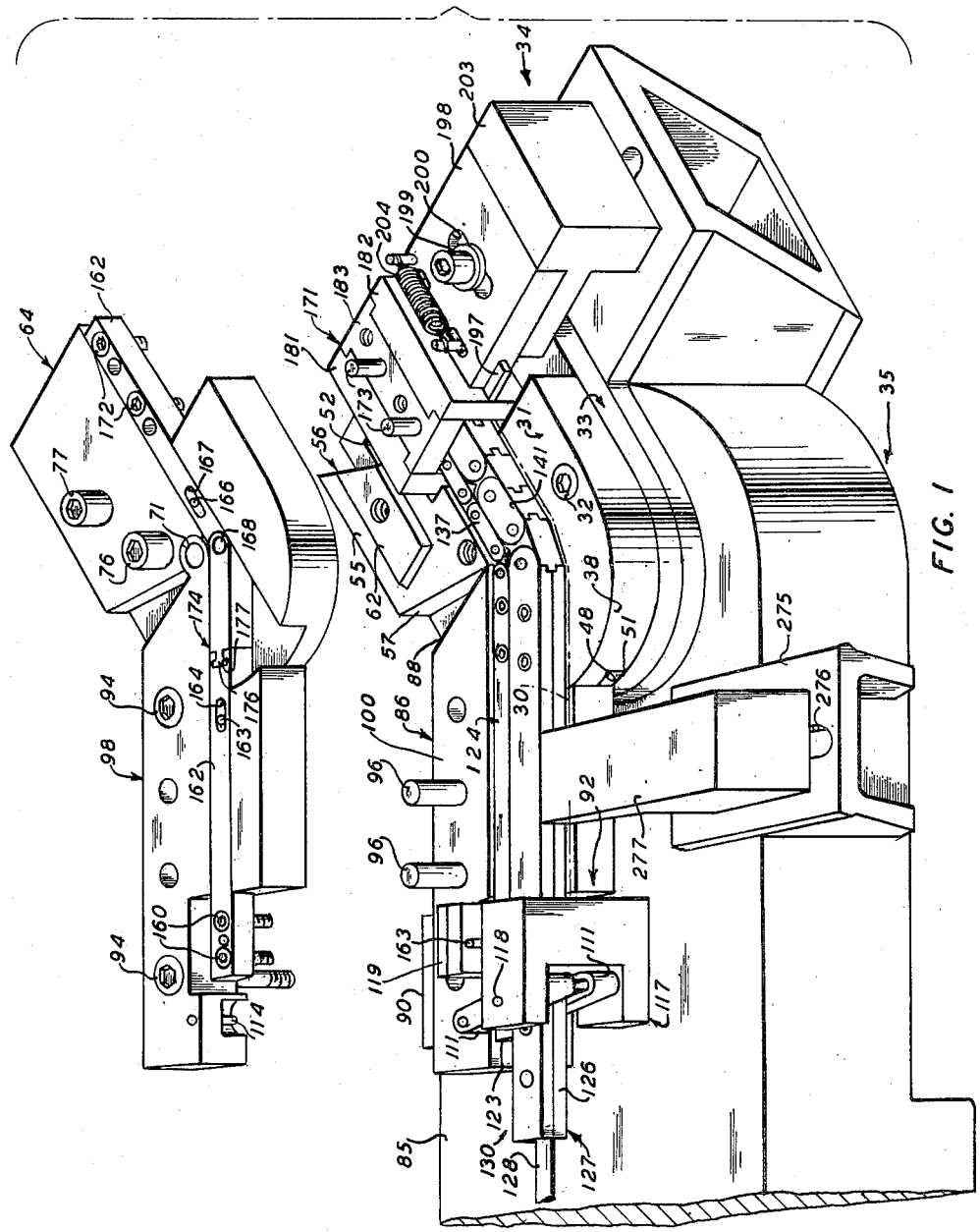
FIG. 1 is a fragmental, partially exploded, perspective view of a bending apparatus illustrating certain features of the preferred embodiment of the invention.

Referring now to the drawings, wherein like numerals are used to designate similar elements throughout the several views, and more particularly to FIGS. 1 and 2, there is illustrated a preferred embodiment of the present invention of apparatus for effecting angular or zero radius bends in rectangular wave guide tubing 30. The apparatus illustrated in FIGS. 1 and 2 is to be adapted to a conventional type Pines bender, designated generally by the numeral 35, wherein a lower die block, designated generally by the numeral 31, is secured by appropriate screw means 32 (FIGS. 1, 2 and 5) to a base plate, designated generally by the numeral 33 (FIGS. 1 and 5) of a bending head, designated generally by the numeral 34 of the conventional Pines bender 35. The bending head 34 is adjustably mounted on the bender 35. The lower die block 31 is provided with a rectangular-shaped projection 36 (FIGS. 3, 4, 11 and 21) which is adapted to fit closely into a corresponding rectangular keyway 37 in the base plate 33 of the bending head 34. The lower die block 31 is terminated on one end by a semicircular portion 38 (FIGS. 1 and 13) and has a bore 39 with the center thereof located on the axis of curvature of the semicircular portion 38.

Figure 5:
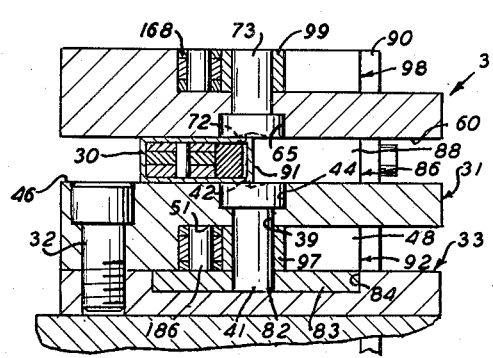
FIG. 5 is a sectional view taken along line 5—5 of FIG. 2.

Referring now to FIG. 5, a flanged pin, designated generally by the numeral 41, with a conical-shaped bore 42, in the head 43 thereof, is positioned in the bore 39, and a counterbore 44 in the lower die block 31 with the apex thereof located in the center of curvature of the semicircular portion 38 of the die block 31 receives the head portion 44. The end of the flanged head 43 of the pin 41 is flush with the upper surface 46 of the lower die block 31 and the conical-shaped bore 42 is located with its apex on the axis of rotation of the bending head 34 and is utilized to accommodate cold flow to the material of the tubing 30 being bent in accordance with the teachings of the above-mentioned copending application.

Figure 8:
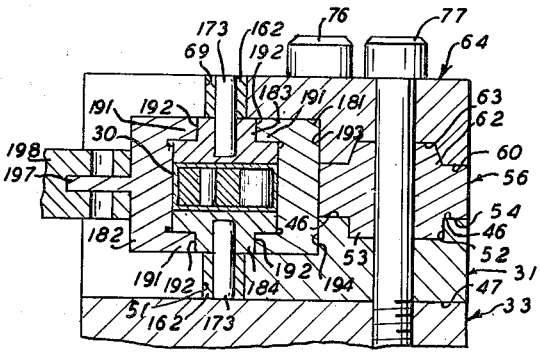
FIG. 8 is a sectional view taken along line 8—8 of FIG. 2.
Figure 9:
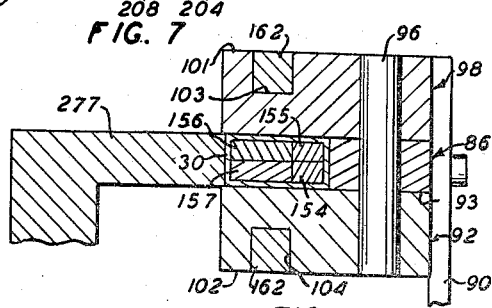
FIG. 9 is a sectional view taken along line 9—9 of FIG. 2.

The lower surface 47 of the lower die block 31 adjacent to the base plate 33 of the bending head 34 and on the end adjacent to the semicircular portion 38, is provided with a cutaway portion 48 which forms a concave, arcuate-shaped shoulder (not shown) and also with an elongated slot 51 which extends from the curved extremity 38 of the lower die block 31 to the opposing extremity of the die block 31 adjacent to the rectangular projection 36. The radius of the curvature of the shoulder 49 is located coincidentally with the axis of rotation of the bending head 34. The upper surface 46 of the lower die block 31 also is provided with a rectangular-shaped depression 52 (FIGS. 1 and 8) in which is located a substantially rectangular-shaped projection 53 of a lesser length on the lower surface 54 of a rotatable forming die 56 secured to the lower die block 31 to prevent relative movement therebetween.

The forming die 56 is provided on one extremity with a plane angularly disposed surface 57 and inclined surface 58 which intersect to form a straight vertical edge 59 which is located coincidentally with the axis of rotation of the bending head 34. The opposing end of the forming die 56 is terminated in a plane inclined surface 61 disposed at 45° with respect to the longitudinal axis thereof. The upper surface 55 of the forming die 56 is provided with a projection 62, with a trapezoidal-shaped cross section, which fits in a substantially rectangular-shaped depression 63, with a trapezoidal-shaped cross section, in the lower surface 60 of an upper die block 64 to prevent relative movement between the forming die 56 and the upper die block 64.

The upper die block 64 is somewhat similar to the lower die block 31 in that one end portion 66 thereof is semicircular shaped and the upper surface 67 is provided with a cutaway portion 68 forming an elongated slot 69 and an arcuate concave shoulder 71. The radius of curvature of the concave shoulder 71 coincides with the axis of rotation of the bending head 34. The lower surface 60 of the upper die block 64 is provided with a counterbore 65 in which is mounted a pin 73, similar to the pin 41 except of shorter length. The center of the pin 73 and the apex of a conical-shaped depression 72 in the head thereof coincides with the axis of rotation of the bending head 34.

The upper die block 64, the forming die 56, and the lower die block 31 are secured together by appropriate screw means 76 and 77. One of the screws 77 also extends into the base plate 33 of the bending head 34. The forming die 56, which is secured rigidly between the upper surface 46 of the lower die block 31 and the lower surface 60 of the upper die block 64, as described previously is provided adjacent to one extremity with a vertical straight edge 59 extending directly above the flanged pin 41 and which coincides with the axis of rotation of the bending head 34. The shank of the pin 41 extends into a central aperture 82 (FIG. 5) in an annular bearing member 83 which is positioned in a circular depression 84 in the base plate 33 of the bending head 34.

A supporting block 85 secured rigidly to the Pines bender 35 and forming a part thereof, is provided with an apertured, L-shaped member 90 to which is bolted a wiper die 86 in such a manner that one extremity thereof is located adjacent to the edge 59 of the forming die 56. The wiper die 86 is provided on one extremity thereof with a plane angularly disposed surface 88 and a curved surface 89 which intersect in a vertical straight line to form an edge 91 located adjacent to the vertical edge 59 of the forming die 56 and substantially coincides with the axis of rotation of the bending head 34.

A lower retaining plate 92 is secured to the lower surface 93 of the wiper die 86 by means of bolts 94—94 and dowels 96—96 and is provided on one extremity thereof with an apertured, substantially semicircular, projecting portion 97 surrounding the shank of the pin 41 and is secured pivotally to the pin 41 for rotatable sliding engagement with the concave shoulder (not shown) on the lower face 47 of the lower die block 31.

A similarly shaped upper retaining plate 98 is secured to the upper surface 100 of the wiper die 86 by means of the bolts 94—94 and the dowel 96—96 and is provided with an apertured, substantially semicircular, projecting portion 99 encompassing the shank of the pin 73 and is in sliding engagement wtih the concave shoulder 71 on the upper surface 67 on the upper die block 64.

The upper and lower surfaces 101 and 102 of the upper and lower retainer plates 98 and 92, respectively, are provided with parallel, rectangular grooves 103 and 104, respectively, extending axially thereof. On edges 106 and 107 of the upper and lower retaining plates 98 and 92 adjacent to the wiper die 86 and adjacent to one end thereof are provided substantially semicircular grooves 108 and 109, respectively, into each of which is secured the end of an elongated linkage 111 having a plurality of slots 112 and 113 therein by means of dowel pins 114 and 116, respectively.

A bifurcated booster block, designated generally by the numeral 117 is secured to the linkages 111—111 by means of dowel pins 118—118 in the slots 112—112 adjacent the ends thereof. The booster block 117 is provided with a plate member 119 secured by appropriate screw means 121—121 to the ends of the furcated portions 122—122 thereof. The plate 119 forms a shoulder and limits the movement of the booster block 117 by engaging the walls of a notch formed in the wiper die 86, as shown in FIG. 13. The booster block 117 is adapted to engage one end 120 of the wave guide tubing 30 during the bending operation.

A two-piece, rigid stem portion 123 of a captive mandrel section 124 which extends parallel and adjacent to the forming wiper die 86 is secured in the intermediate slots 113—113 in the linkages 111—111 by means of a dowel pin 115 and slidably between the furcations 122—122 in the booster block 117 and in contact with one side of the plate 119.

A two-piece, rigid stem portion 126 of a removable mandrel section 127 secured to the rod 128 of a mandrel extractor cylinder (not shown) is positioned slidably between the furcations 122—122 in the booster block 117 and the linkages 111—111 and extends parallel to the captive mandrel section 124 and in juxtaposition therewith to form a segmental mandrel 130 to support the interior surface of the wave guide tubing 30. As the tube is bent the links 111 pivot about the pins 114 and 116 and the dowel pins 115 and 118 slide within the slots 113 and 112 allowing the mandrel 127 to maintain a fixed position with respect to the booster block 117 and the tube 30.

Figure 6:
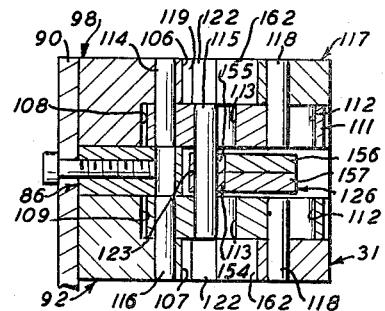
FIG. 6 is a sectional view taken along line 6—6 of FIG. 2.
Figure 7:
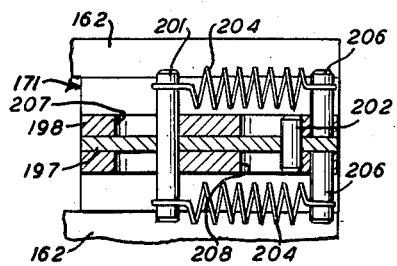
FIG. 7 is a sectional view taken along line 7—7 of FIG. 2.

The respective sections 124 and 127 of the mandrel 130 are provided with articulated end portions, 131 and 132 respectively, which include a plurality of serially positioned, pivotally interconnected links 136 to 143, inclusive, of predetermined contours. The links 136 to 143, inclusive, are provided with complementary projecting arcuate lugs in sliding relationship with concave arcuate shoulders or recesses for nesting the ends of the links together for limited movement in one direction. The links 136 to 143, inclusive, are interconnected by means of dowel pins 146 and 147 in driving fit in apertures in adjacent mating links. The links 136 and 140 of the articulated end portions 131 and 132 of the mandrel sections 124 and 127 are secured in a bifurcated end of the rigid stems 123 and 126, respectively. The stems 123 and 126 are formed of two substantially rectangular pieces 154 and 155, and 156 and 157 respectively (FIGS. 1, 5 and 6) held together by screw means 148 and 149 and dowel pins 151 and 152, respectively.

The articulated or flexible end portions 131 and 132 of the sections 124 and 127 of the mandrel 130, in operation, are contiguous to form a laminated portion for the purpose of supporting the interior of the walls of a section of wave guide tubing 30 in the region of a bend during the bending operation for maintaining uniform internal dimensions therein.

The link member 136 of the captive section 124 of the mandrel 130 has an angular indentation 153 in the surface thereof for supporting the interior of the wall of the portion of the wave guide tubing adjacent to that which is in contact with adjacent edges 59 and 61 of the forming die 56 and wiper die 86 at the axis of bend of a zero radius bend.

The surface of the links 140 to 143, inclusive, of removable mandrel section 127 nearest the axis of bend are provided with V-shaped, indented portions, similar to the arcuate indentations described and illustrated in a copending application, Francis J. Fuchs, Jr. and Robert H. Hall, Serial No. 432,272, filed May 25, 1954, now Patent Number 2,902,077, to permit the section 127 of the mandrel 130 to be withdrawn from the tubing 30 after the bending operation takes place and thus permit the section of bent wave guide tubing 30 to be removed from the bending apparatus.

Secured rigidly in slots 161—161 extending transversely of the furcations 122—122 in the booster block 117 and on opposing sides thereof by appropriate screw means 160 and dowel means 163 and secured slidably in the slots 103 and 104 formed in the upper and lower retaining plates 98 and 92 and in the slots 69 and 51, formed in the upper and lower die blocks 64 and 31, respectively, are two identical, slotted booster arms 162—162, one of which is secured slidably to each of the upper and lower retaining plates 98 and 92 by dowel pins 163—163 some of which extend through slots 164—164 in the booster arms 162—162 and also to the corresponding upper and lower surfaces 67 and 47 of the die blocks 64 and 31, respectively, by dowel pins 166—166 extending through a slot 167—167 in the arm 162—162.

Each of the booster arms 162—162 is provided with a pivotal connection 168 adjacent to the axis of rotation of the bending head 134 to permit one end portion of each of the booster arms 162—162 to pivot with respect to the other. The end of each of the booster arms 162 opposite to those secured to the booster block 117 is secured to a serrated clamping means, designated generally by the numeral 171 (FIGS. 1, 2, 4, 8, 10 and 12) utilized to clamp an end of a section of the wave guide tubing 30 to be bent, by appropriate screw means 172—172 and dowel pins 173—173.

The booster arms 162—162 are each provided with a quick detachable connection, designated generally by the numeral 174 by means of a T-shaped end 176 on one section, which is slidable transversely in a corresponding T-shaped groove 177 on the end of the other section. The booster arms 162—162 are utilized to insure that the distance between the booster block 117 and clamping means 171 as measured along a neutral axis of the bent wave guide tubing 30 is not reduced during the bending operation.

One embodiment of the serrated clamping means 171 (FIGS. 1, 2, 4, 8, 10 and 12) which is utilized to clamp a straight section of wave guide tubing 30 is made up of four substantially rectangular-shaped mating sections 181 to 184, inclusive, forming two sides, a top and a bottom of the clamping means, respectively, and are provided with rectangular-shaped, serrated faces 186 to 189, inclusive, respectively.

The top and bottom sections 183 and 184 have the entire rectangular-shaped adjacent sides covered with serrations, whereas the side sections 181 and 182 are provided only with centrally located strips extending between opposing ends thereof and between the portions thereof contacted by the top and bottom of the top and bottom sections 183 and 184. The side sections 181 and 182 are provided with projecting portions 191—191 which extend from the sides thereof into corresponding depressions 192—192 formed in the top and bottom sections 183 and 184.

Figure 4:
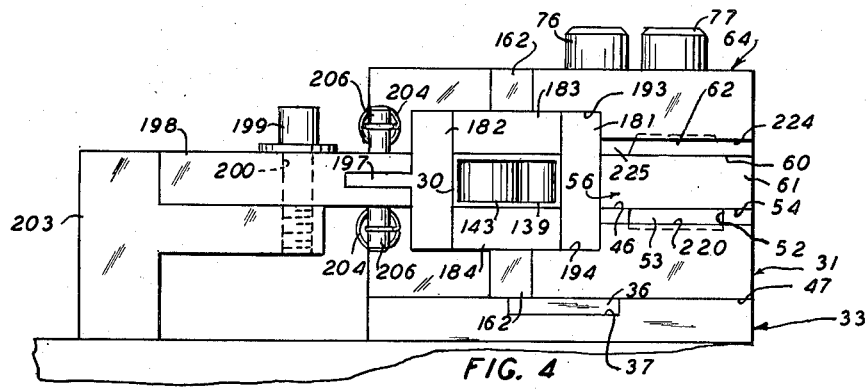
FIG. 4 is an end view of the apparatus shown in FIG. 2.

The side section 181 is secured in a working fit between the upper and lower die blocks 64 and 31, in cutaway portions 193 and 194 on the lower and upper faces 60 and 46 thereof, respectively, and in a depression or cutaway portion 196 in the face of the forming die 56. The other side section 182 of the clamping member 171 is provided with an apertured projection 197, extending centrally of one side thereof, which is secured slidably to a slotted, bifurcated member 198 by dowel pins 201 and 202. The bifurcated member 198 is secured rigidly and adjustably to a clamp die slide 203 by means of a bolt 199 and a slot 200 (FIGS. 1, 4 and 10).

Resilient helical springs 204—204 are secured to dowel pins 206—206 projecting from opposing sides of the bifurcated member 198 and to the dowel pin 201 secured rigidly in the projection 197 on the slide section 182 of the serrated clamp 171 and slidably in a slot 207 in the bifurcated member 198. The springs 204—204 return the side section 182 of the clamp 171 to the proper position to assure that the projecting portions 191—191 of the side sections 181 and 182 of the clamp 171 are properly aligned with the indentations 192—192 in the top section 183 and bottom section 184 of the clamp during the initial clamping operation after the side section 182 has been moved with respect to the bifurcated member 198. The clamp 171 which is secured to the booster arm 162 slides to the left with respect to the forming die 56 during the swinging of the bending head 34, as viewed in FIGS. 1 and 2. The desired initial position of the top section 183 and the bottom section 184 along with the side section 181 is insured by placing adjacent ends thereof flush with the ends of the upper die block 64 and the lower die block 31.

The clamping force is applied by the clamp die slide 203 which moves the bifurcated member 198 on the side section 182 of the clamp 171 toward the wave guide tubing 30 positioned between the top section 183 and the bottom section 184 and adjacent to the side section 181; however, the projecting portion 197 of the clamp 171 is caused to slide between the furcations of the bifurcated member 198 during the bending operation causing the dowel pins 201 and 202 to slide in the slots 207 and 208, respectively, in spite of the friction between the elements caused by the clamping pressure.

An alternate embodiment of the serrated clamp, designated generally by the numeral 271 (FIG. 20) is provided for clamping a previously bent section of wave guide tubing in order to form sections of wave guide tubing similar to that illustrated in FIG. 24.

The alternate embodiment of the serrated clamp 271 (FIGS. 20 to 23, inclusive) is made up of two mating sections 211 and 212 each of which is secured to the opposing booster arms 162—162. The lower section 211 has a serrated, substantially V-shaped, clamping jaw 213, projecting upwardly from the upper face 214 thereof. The serrations on the outer surface of one of the legs of the V-shaped clamping jaw 213 are adapted to contact the outside surface of the wall of the wave guide tubing 30 which contacts the forming die 56 while the serrations on the leg 216 contact the outside surface of the wall of the wave guide tubing 30 and also are flush with the face of the forming die 56. The inner surface 217 of the leg 216 of the V-shaped projection jaw 213 is in contact with the indented portion 196 of the side of the forming die 56 and inner surface 210 is parallel to and spaced from the inclined end 61 of the forming die 56.

The surface formed by a cutaway portion 215 of the lower surface 218 of the lower section 211 of the serrated clamp 271, opposite to the face 214 on which the V-shaped clamping jaw 213 projects, is in sliding contact with the cutaway portion 220 of the upper surface 46 of the lower die block 31. A remaining portion of the lower surface 218 of the lower section 211 is in sliding contact with the adjacent corresponding cutout portion 194 on the upper side of the lower die block 31.

The upper section 212 of a clamp 271 forming the alternate embodiment has a substantially arcuate-shaped, serrated clamping jaw 219 extending downwardly from the upper face 221 thereof, the serrations of which are in contact with that outer surface of the wall of the rectangular wave guide 30 which is remote from the forming die 56.

An intermediate portion 222 of the arcuate-shaped, serrated clamping jaw 219 is removed and replaced by a metal alloy such as Cerromatrix which is a product of the Cerro De Pasco Copper Company, 40 Wall Street, New York 7, New York. This metal alloy is utilized to form the proper contour in the clamping jaw 219 to correspond to the contour of the wave guide tubing 30 in the previously bent region without necessitating accurate machining thereof.

The upper section 212 of the clamping means is provided with a substantially V-shaped projection 223 which is adapted to slide between the extremity of the projecting jaw 213 on the lower section 211 and into a cutout portion 224 of the lower surface 60 of the upper die block 64. One side of the projection 223 is parallel to and spaced from an inclined shoulder 225 (FIGS. 4, 20 and 21) formed by the cutout portion 224. A portion of the upper surface 226 of the upper section 212 is adapted to be in sliding engagement with the cutout portion 193 on the lower surface 60 of the upper die block 64. The upper section 212 of the clamping means 271 is also provided with a substantially rectangular, depending portion 227 which is adapted to fit into a corresponding rectangular slot 228 in the lower section 211 of the clamping means 271.

The upper section 212 of the clamping means 271 forming the alternate embodiment has a projecting portion 229, similar to the projecting portion 197 on the other embodiment 171, secured to the bifurcated member 198 which, in turn, is connected to the clamp die slide 203. The clamping die slide 203 forces the upper section 212 of the clamping means toward the lower section 211 of the clamping means to form an angular die cavity to clamp and to support externally a previously bent section of wave guide tubing 30 between the two serrated clamping jaws 213 and 219 formed thereon.

A pressure die support 275 (see FIG. 1) is mounted upon the bending apparatus 35 and is provided in the upper surface thereof with a slideway 276 in which is mounted slidably a pressure die 277. The pressure die 277 is adapted to engage the wall of the portion of the wave guide tubing 30 which is positioned in the bending apparatus 35 with the opposing wall thereof in engagement with the wiper die 86.

*Operation*

The wave guide tubing 30 is placed around the captive section 124 of the mandrel 130 with one wall thereof to be bent with a zero radius H bend in engagement with the wiper die 86 and the former die 56 which are axially aligned in an unoperated position. The wave guide tubing 30 in this position is in sliding contact with the upper and lower surfaces of the lower and upper retaining plates 92 and 98 and die blocks 31 and 64, respectively.

One end of the wave guide tubing 70 is clamped in place by the serrated clamp 171 by the actuation of the clamp die slide 203 while the opposing end of the wave guide tubing 30 is in contact with the booster block 117. The pressure die 277 is then moved into engagement with the portion of the wave guide tubing 30 adjacent to the end 120 in contact with the booster block 117.

The removable section 127 of the mandrel 130 is then inserted into position by the actuation of the mandrel extractor cylinder (not shown). The bending head 34 is then actuated through a predetermined angle of approximately 64° until the angularly disposed surfaces 88 and 57 on the ends of the wiper die 86 and forming die 56, respectively, are in contact with each other, whereby the wall of the wave guide tubing 30 is bent to form a sharp angle zero radius bend about the edges 59 and 91 of the forming die 56 and the wiper die 86, respectively.

During the bending operation, the booster block 117 and the clamping means 171 compress the tube 30 along the neutral axis, shifting the pivot axis 168 of the booster arms 162 to the right at one side of a line coincident with the neutral axis of the tube before bending. This compression forces the booster block 117 and the clamp 171 to slide with respect to the wiper die 86 and forming die 56 and the axis of rotation of the bending head 34.

The displaced material in the wall of the wave guide tubing 30 flows outwardly into the conical-shaped indentations 42 and 72 formed in the flanged pins 41 and 73, respectively, and an indentation formed between curved surfaces 58 and 89 on the forming die 56 and wiper die 86, respectively, in accordance with the teaching of my copending application, Serial Number 412,730, filed February 26, 1954, now Patent Number 2,873,786.

It should be noted that in the specific preferred embodiment of the invention, it is desirable to have an ultimate bend of 60°; however, a bend of approximately 64° is placed in the wave guide tubing 30 in order to allow for an inherent resilient spring back of the bent tubing 30 after the release of the bending forces on completion of the bending operation.

After the bending operation has been completed, the removable section 127 of the mandrel 130 is withdrawn by means of a mandrel extractor cylinder imparting reverse movement on the rod 128, the bent section of the tubing 30 is unclamped, taken out from between the retaining plates 92 and 98 and die blocks 31 and 64, and slipped off of the captive section of the mandrel, and in this way removed from the bending apparatus by hand.

A section of wave guide tubing 30 bent in this manner and with the above-described apparatus is illustrated in FIG. 17. A section of the wall in the region of the bend and opposite that in which the zero radius bend is formed is removed as illustrated in FIG. 18. A flange is secured to the bent section of wave guide tubing 30, illustrated in FIG. 18, to form a section illustrated in FIG. 19 to which can be connected a flanged straight section of wave guide tubing to form a Y section.

If it is desirable to form a second bend in a previously bent section of wave guide tubing 30, the previously bent section of wave guide tubing 30 is clamped in the alternate embodiment 271 of the applicant's clamping means which is utilized in conjunction with the remainder of the bending apparatus as described previously, and the wave guide tubing 30 is bent in a similar manner to that described above to form a section of wave guide tubing similar to that illustrated in FIG. 24.

It is to be understood that the above-described arrangements are simply illustrative of the application of the principles of the invention. Other arrangements may be devised by those skilled in the art which will embody the principles of the invention and fall within the spirit and scope thereof.

What is claimed is:

1. Apparatus for effecting a bend in a tube comprising a base, a forming die pivotably mounted on said base, a wiper die secured to said base and having one extremity thereof adjacent to one extremity of said forming die, means for securing a portion of the tube adjacent to said wiper die, means for supporting the interior of the tube during the bending operation, means for pivoting said forming die, spring-biased tube clamping means secured to said base pivotably with said forming die and slidably with respect to said forming die, a booster block positioned adjacent to the portion of the tube in contact with said wiper die, and means for connecting operatively said booster block to said clamping means for maintaining the tube of constant length along the longitudinal axis of the tube during the bending operation whereby said clamping means will return to the original clamping position with respect to the extremity of said forming die at the completion of the bending operation.

2. Apparatus for effecting a bend in a tube comprising a base, a forming die pivotably mounted on said base, a wiper die secured to said base and having one extremity thereof adjacent to one extremity of said forming die, means for securing a portion of the tube adjacent to said wiper die, means for supporting the interior of the tube during the bending operation, means for pivoting said forming die, tube clamping means secured to said base pivotally with said forming die and slidably with respect to said forming die along the longitudinal axis of the tube, a booster block positioned adjacent to the portion of the tube in contact with said wiper die, and means for connecting operatively said booster block to said clamping means for maintaining the tube of a constant length along the longitudinal axis.

3. Apparatus for effecting a bend in a tube comprising a base, a forming die pivotally mounted on said base, a wiper die secured to said base and having one extremity thereof adjacent to one extremity of said forming die, means for securing a portion of the tube adjacent to said wiper die, means for supporting the interior of the tube during the bending operation, means for pivoting said forming die, tube clamping means having an angular-shaped concavity for clamping a bent portion of a previously bent tube therein secured to said base pivotably with said forming die and slidably with respect to said forming die along the longitudinal axis of the tube, a booster block positioned adjacent to the portion of the tube in contact with said wiper die, and means for connecting operatively said booster block to said clamping means for maintaining the tube of constant length along the longitudinal axis of the tube during the bending operation.

4. A tube bending apparatus, which comprises a pivotable bending head, a movable forming die mounted on said bending head and having a portion of a forming surface thereof offset a predetermined distance from the remainder of said forming surface for controlling the flow of material of the tube walls being bent, a clamping means secured slidably on said bending head for holding one end of the tube against the forming die during the bending operation, a stationary wiper die positioned adjacent to said forming die and having a portion of the forming surface thereof offset a predetermined distance from the remainder of said forming surface for controlling the flow of material of the tube walls being bent, a pressure die for urging the opposing end of the tube against the forming surface of the wiper die, booster means for engaging the opposing end of the tube during the bending operation, means to connect the booster means and the clamping means together during the bending operation for shortening the inside corner wall and lengthening the outside corner wall of the tube to maintain the length of the longitudinal axis of the tube constant, a captive mandrel section having a rigid stem and articulated end portion mounted pivotally and slidably adjacent to the forming surface of the wiper die, a removable mandrel section in juxtaposition with the captive mandrel section having an articulated end portion and a rigid stem for inserting the removable mandrel section into the tube to be bent and removing the removable mandrel section from a bent tube.

5. Apparatus for effecting a zero radius mitre bend in a rectangular tubing, which comprises a pivotally mounted bending head, a wiper die mounted in a stationary position on the apparatus, a forming die secured rigidly to and pivotable with the bending head, a pressure die for urging a portion of one extremity of the tubing into contact with the wiper die, clamping means pivotable with and slidably secured on the bending head for securing the opposing extremity of the tubing to the bending head and in contact with the forming die, a means to support the interior of the tube, a booster block in contact with said first-mentioned extremity of said tubing, and means for connecting the booster block and the clamping means operatively together for causing relative movement of the clamping means and the booster block with the wiper die and the forming die to maintain the longitudinal axis of the tube constant during the bending operation.

6. Apparatus for bending rectangular tubes angularly comprising a base, a movable forming die mounted pivotably upon said base and having a sharp angular corner on one extremity, a stationary wiper die secured rigidly to said base and having a sharp angular corner on one extremity adjacent to the sharp angular corner of said forming die, means for clamping a first extremity of a tube on said base adjacent said forming die, said clamping means being secured pivotably to said base with said forming die and slidably with respect to said forming die means for urging a portion of a second extremity of said tube into contact with said wiper die, a booster block slidably mounted and contiguous to said second extremity for limiting axial movement of the tube, means for supporting the interior of said tube, means for pivoting said forming die and said clamping means to move a portion of said tube secured in said clamping means and to bend said tube about the sharp angular corners of said forming die and said wiper die, and means interconnecting said booster means and said clamping block for sliding said booster block and said clamping means respectively adjacent to said wiper die and said forming die toward the sharp angular corners while maintaining the length of the tube constant along the longitudinal axis.

7. Apparatus for effecting a zero radius mitre bend in a tube having a prebent portion, which comprises a pivotally mounted bending head, a wiper die mounted in a stationary position on the apparatus, a forming die secured rigidly to and pivotable with the bending head, a pressure die for urging a portion of the tubing being bent adjacent one extremity thereof in contact with the wiper die, clamping means pivotable with and slidably secured on the bending head for slidably securing the opposing extremity of the tubing to the bending head and in contact with the forming die, the clamping means having an angular concavity for receiving the prebent portion of the tube, means to support the interior of the tube, a booster block in contact with said one extremity of said tubing, and means connecting the booster means and the clamping block operatively together for causing relative movement of the clamping means and the booster block with respect to the forming die and wiper die respectively while maintaining the tube of constant length along the longitudinal axis during the bending operation.

8. Apparatus for bending rectangular tubes comprising a base, a forming die having a sharp angular corner on one extremity thereof mounted pivotably upon the base, a stationary wiper die secured rigidly to said base and having a sharp angular corner on one extremity thereof adjacent to the sharp angular corner of said forming die, the adjacent sharp angular corners of the forming die and the wiper die forming a straight vertical edge when the forming die is pivoted, an end clamp slidably mounted on the forming die for supporting one end of a tube to be bent, a side clamp mounted on the base for holding a portion of the tube against the wiper die, a booster slidably mounted with respect to the wiper die for supporting the other end of the tube, a first booster arm slidably mounted in the wiper die and connected at one end to the booster, a second booster arm slidably mounted in the forming die and pivotably connected at one end to the other end of said first booster arm and connected at its other end to the end clamp, the combined lengths of the pivotably connected booster arms equaling the length of the longitudinal axis of the tube, the pivot point of the booster arms being located above the tube and adjacent the intersection of the sharp angular corners of the forming and wiper dies, a mandrel connected to the wiper die for supporting the interior of the tube, said mandrel extending through the booster, and means to pivot the forming die to bend the tube around the straight vertical edge formed by the adjacent corners of the wiper and forming die, whereby relative movement between the booster and clamp and the wiper die and the forming die, respectively, maintains the longitudinal axis of the tube constant throughout the bending operation.

9. In an apparatus for bending a tube, a base, a clamping lever pivotably mounted about an axis on the base, a pair of gripping sections slidably mounted on the lever for movement along the length of the clamping lever, means for urging the gripping sections away from the pivot axis of the clamping lever, means for mounting one of said gripping sections to move toward the other gripping section, means for advancing said movably mounted gripping section to engage a tube positioned between said gripping sections, a wiper die mounted on said base to engage the tube near the pivot axis of the lever, a booster block slidably mounted on the base to engage the extremity of the tube projecting from gripping sections beyond the pivot axis, means for pivoting the bending lever to bend the tube about the wiper die and move the gripping sections against the action of the urging means, and means interconnecting the gripping sections with the booster block for imparting movement of the gripping sections against the action of the urging means to the booster block to maintain the longitudinal length of tube constant during the pivoting of the lever.

References Cited in the file of this patent

UNITED STATES PATENTS

| 174,607 | Wright | Mar. 7, 1876 |
| 347,488 | Hunsicker | Aug. 17, 1896 |
| 620,227 | Condon | Feb. 28, 1899 |
| 630,082 | Charlet | Aug. 1, 1899 |
| 674,574 | Decrette | May 21, 1901 |
| 757,593 | Atwood | Apr. 19, 1904 |
| 791,586 | Stambaugh | June 6, 1905 |
| 973,401 | Bailey | Oct. 18, 1910 |
| 983,664 | Wilson | Feb. 7, 1911 |
| 1,261,191 | Vallone | Apr. 2, 1918 |
| 1,975,045 | Kossowski | Sept. 25, 1934 |
| 2,357,873 | Bower | Sept. 12, 1944 |
| 2,571,416 | Brown | Oct. 16, 1951 |
| 2,792,048 | Fuchs | May 14, 1957 |
| 2,873,786 | Fuchs | Feb. 17, 1959 |

FOREIGN PATENTS

| 380,094 | Germany | Sept. 1, 1923 |
| 729,216 | Germany | Dec. 11, 1942 |
| 18,986 | Great Britain | Sept. 3, 1903 |
| 638,130 | Great Britain | May 31, 1950 |

UNITED STATES PATENT OFFICE
CERTIFICATE OF CORRECTION

Patent No. 3,017,914                                January 23, 1962

Francis J. Fuchs, Jr.

It is hereby certified that error appears in the above numbered patent requiring correction and that the said Letters Patent should read as corrected below.

Column 7, line 2, for "slide" read -- side --; column 8, line 26, for "clamping" read -- clamp --; column 11, line 35, for "means", second occurrence, read -- block --; line 36, for "block" read -- means --.

Signed and sealed this 22nd day of May 1962.

(SEAL)
Attest:

ERNEST W. SWIDER
Attesting Officer

DAVID L. LADD
Commissioner of Patents